R. O. ATKINSON.
BALING PRESS.
APPLICATION FILED JUNE 20, 1914.

1,126,680.

Patented Feb. 2, 1915.
3 SHEETS—SHEET 1.

WITNESSES:
John A. Naismith
L. T. Jones

INVENTOR
Robert O. Atkinson
BY F. C. Boles
HIS ATTORNEY

R. O. ATKINSON.
BALING PRESS.
APPLICATION FILED JUNE 20, 1914.
1,126,680.
Patented Feb. 2, 1915.
3 SHEETS—SHEET 2.
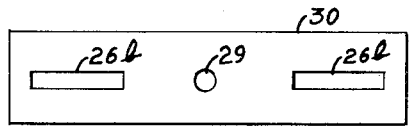
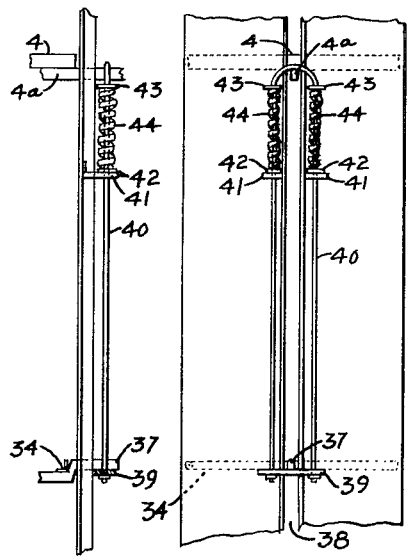
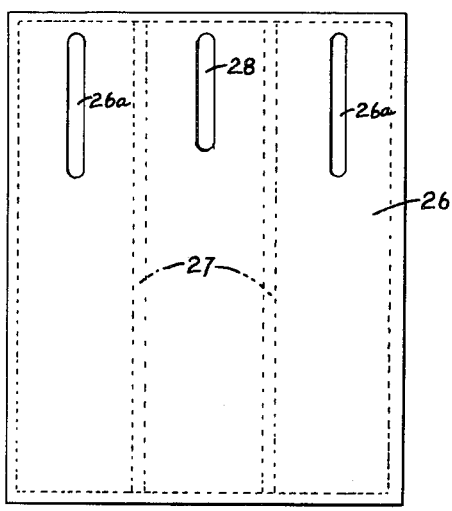
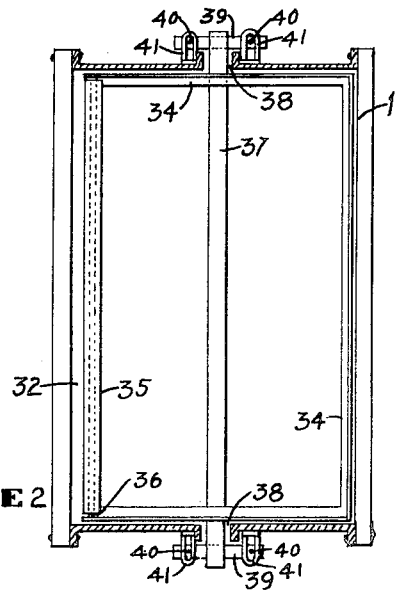
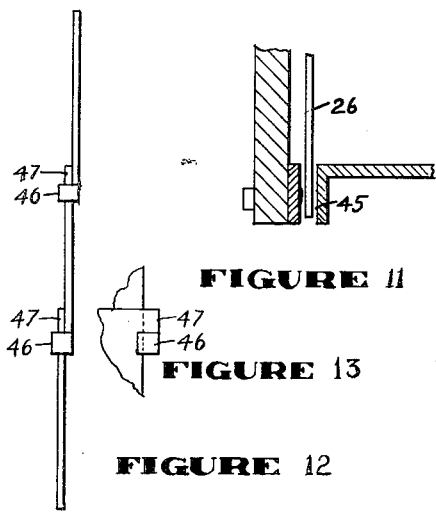
WITNESSES:
John A. Naismith
L. J. Jones
INVENTOR
Robert O. Atkinson
BY F. C. Bates
HIS ATTORNEY

R. O. ATKINSON.
BALING PRESS.
APPLICATION FILED JUNE 20, 1914.

1,126,680.

Patented Feb. 2, 1915.

3 SHEETS—SHEET 3.

WITNESSES:
John A. Naismith
L. I. Jones

INVENTOR:
Robert O. Atkinson
BY F. C. Bates
HIS ATTORNEY

UNITED STATES PATENT OFFICE.

ROBERT O. ATKINSON, OF EDEN VALE, CALIFORNIA, ASSIGNOR OF ONE-HALF TO WARREN L. SMITH, OF FERNDALE, CALIFORNIA.

BALING-PRESS.

1,126,680.      Specification of Letters Patent.      Patented Feb. 2, 1915.

Application filed June 20, 1914. Serial No. 846,318.

*To all whom it may concern:*

Be it known that I, ROBERT O. ATKINSON, a citizen of the United States, and resident of Eden Vale, in the county of Santa Clara and State of California, have invented certain new and useful Improvements in Baling-Presses, of which the following is a specification.

My invention relates broadly to baling-presses, and more particularly to that class of presses in which the plunger travels vertically upward to compression.

In operating the type of presses herein considered there is a great loss of time due to the accumulation of material beneath the filling platform and the press proper, which must be frequently cleared away, and to the fact that when the feed-door is closed and the plunger advancing, the feeder men must stand prepared to throw forward the next charge of material to be pressed the moment the plunger is dropped.

It is one object of my invention to prevent any great accumulation of material under the filling platform and the press.

Another object is to enable the feeder men to continue to throw material forward ready for the next stroke of the plunger and thus relieve the tension of waiting and also economize greatly in the operation of the machine.

A third object is to still further safeguard the men working on the feed platform, and a fourth object is to prevent dust and fine matter from being blown through the press chamber and up into the faces of the men on the discharge platform.

A final object of my invention is to produce an improvement that will accomplish these objects that can be adapted for use on machines of this type already in use as well as be incorporated in new machines while building.

The invention will be best understood from a consideration of the following detailed description, in connection with the accompanying drawings forming a part of this specification, in which:—

Figure 14:
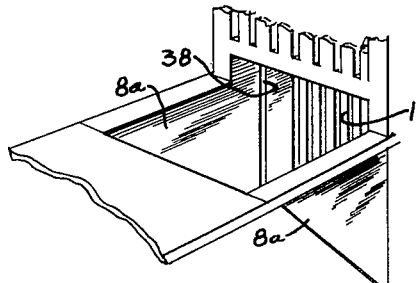
Figure 1:
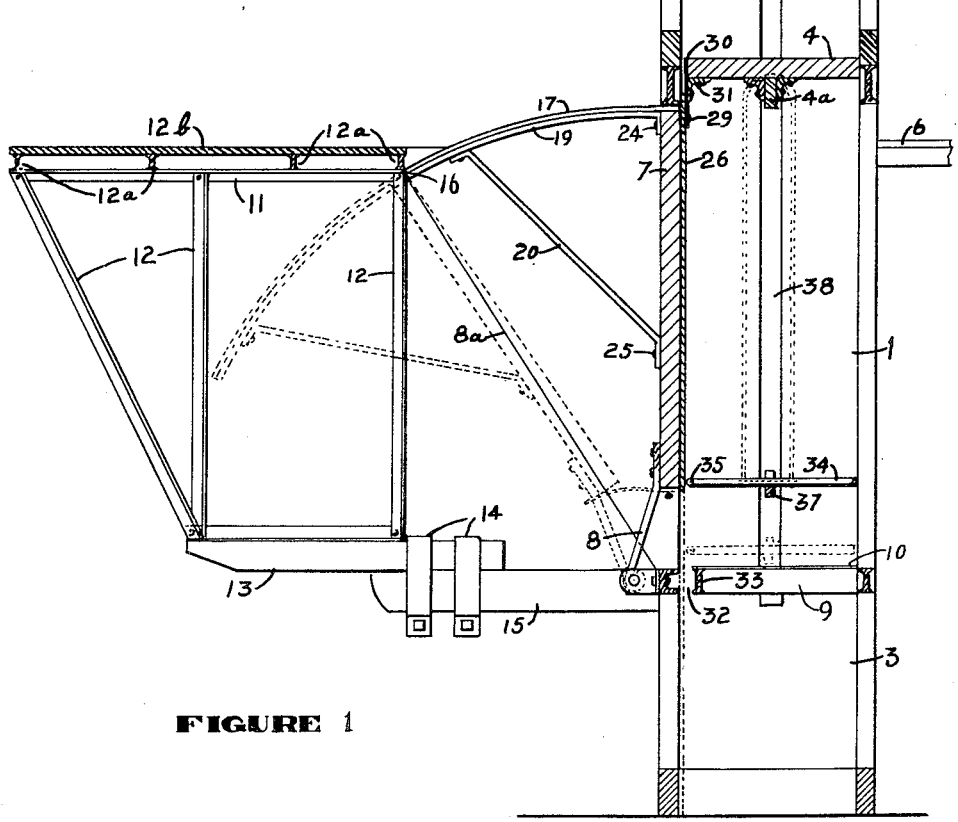
Figure 8:
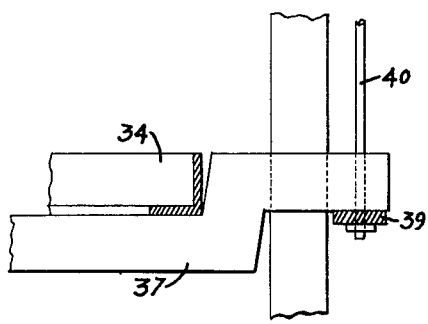
Figure 7:
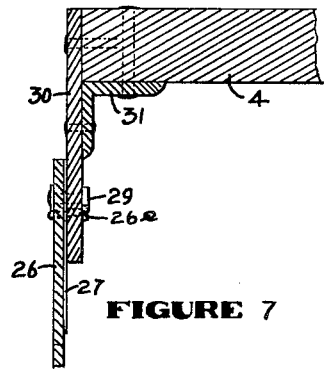
Figure 9:
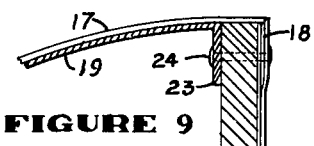
Figure 10:
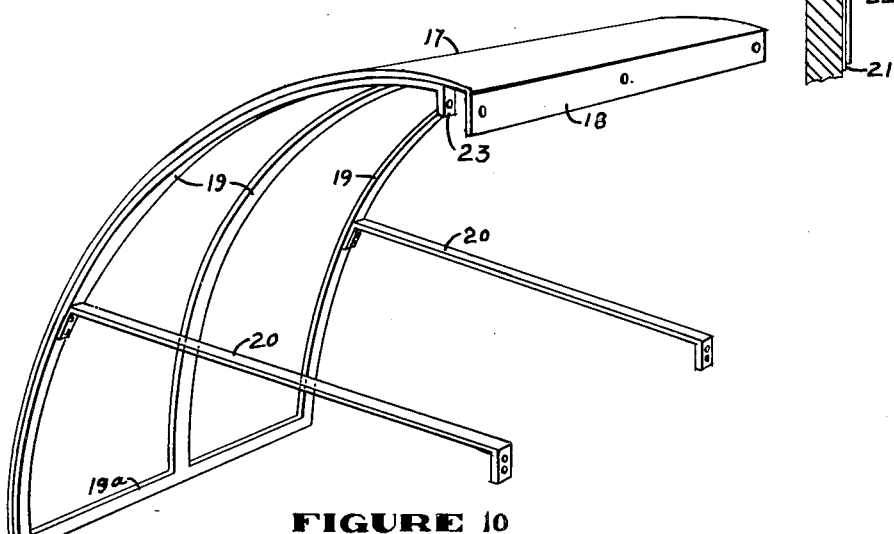

Figure 1 is a vertical cross section through a baling-press with my improvement attached thereto, parts being broken away. Fig. 2 is a plan view of the roller frame and roller in position. Fig. 3 is a detail elevation showing the manner of carrying the roller frame, parts being broken away. Fig. 4 is a side elevation of detail 3. Fig. 5 is a front elevation of the supporting plate. Fig. 6 is a front elevation of the press-chamber guard-plate. Fig. 7 is a detail section showing manner of attaching the press-chamber guard-plate to the supporting plate, and the supporting plate to the plunger head, parts being broken away. Fig. 8 is a detail side elevation showing construction of the bar carrying the roller frame and roller, parts being broken away. Fig. 9 is a detail section showing the manner of attaching the curved guard-plate to the feed-door, parts being broken away. Fig. 10 is a perspective view of the curved guard-plate and the braces attached thereto. Fig. 11 is a detail horizontal section through one corner of a bailing-press showing method of adapting a new machine to accommodate the press-chamber guard-plate. Fig. 12 is a side elevation of a press-chamber guard-plate made in three sections. Fig. 13 is a detail elevation showing method of joining plates shown in Fig. 12, parts being broken away. Fig. 14 is a perspective sketch illustrating how a chute is formed to the press-chamber when the feed-door is open.

In the drawings similar numerals refer to similar parts throughout the several views.

Referring now to the drawings, 1 indicates the press-chamber, 2 the bale-chamber and 3 the supporting framework of a baling-press in which the plunger 4 travels vertically upward to compression. The bale-discharge door is shown at 5 and discharge platform at 6. A feed-door is shown at 7 opening outwardly from the top and hinged at the bottom as 8, sides 8ª attached to said baling-press forming a chute in which said feed-door 8 operates. The bottom of said press-chamber 1 is shown at 9. At 38 are shown the slots through which the plunger 4 is connected to arms not shown by bar 4ª. At 10 is shown a metallic plate covering said bottom 9. All of these above mentioned parts, and the mechanism used in operating the press, not shown, constitute the machine upon which my improvement is built.

An essential part of my improvement is a platform, as 11, supported by a framework 12, preferably built of angle-irons braced and bolted together having I beams, as 12ª, resting thereon, upon which floor 12ᵇ is laid. Said framework 12 rests upon, and is secured to, timbers 13 which are fastened by bands 14 to the two projecting arms 15, said arms 15 being an integral part of supporting framework 3 of the baling-press. Said platform 11 is set out from the press proper a sufficient distance to allow door 7 to swing open until its upper edge will just clear the lower edge of said platform 11 as shown at 16. To the upper edge of feed-door 7 I attach a curved metallic guard-plate 17. The upper edge of said guard-plate 17 is bent downward a distance, as 18, forming a flange thereon, said flange being drilled at the proper intervals to receive bolts. Said guard-plate 17 is reinforced by metallic ribs as 19 placed parallel to the movement of said door, and ribs 19ª running transversely thereto, and supported by braces 20 fastened thereto. In attaching said guard-plate 17 to the upper edge of said feed-door 7 flange 18 is slipped down between the inner lining 21 and reinforcements 22 of said feed-door 7, curved ribs 19 are bent downwardly at their upper ends as shown at 23 to engage the outside of said feed-door 7 and then the whole held securely in place by bolts 24 passing therethrough. Braces 20 are securely bolted to said door 7 as shown at 25, guard-plate 17 thus effectually closing the aperture that would otherwise exist between the platform 11 and the baling-press proper when feed-door 7 is closed. At 26 is shown a vertically movable press-chamber guard reinforced and stiffened by ribs as 27. At 28 is shown a vertical slot cut in said press-chamber guard adapted to engage a bolt 29 set in supporting plate 30. Supporting plate 30 is securely bolted to angle iron 31 which is in turn securely fastened to the under side of plunger 4 close to the outer longitudinal edge thereof as shown in detail in Fig. 7, the side of the press facing the feed-platform being considered the outer side. In order to permit the free vertical movement of press-chamber guard 26 a slot 32 is formed in the bottom 9 of press-chamber 1. Said slot 32 is formed by cutting back said bottom 9 the required distance and building in an additional I beam to support the same as shown at 33. It is of course essential that some means be used to prevent the lower edge of said press-chamber guard 26 from being forced into said press-chamber when it is drawn upward and out of said slot 32. To accomplish this result a roller-frame 34 is used, made of angle iron and adapted to reciprocate in said press-chamber 1, and having a roller 35 revolubly mounted in its outer side upon an axial rod 36. The dimensions of said roller-frame 34 are such as to keep the roller 35 against the inner surface of said press-chamber guard 26 and hold the same at all times in line with said slot 32. When said plunger 4 has reached the end of its stroke said press-chamber guard 26 is drawn a distance above and free of said slot 32, therefore it is necessary that said roller-frame 34 travel upward a distance at the same time in order to keep said roller 35 constantly against the inner side of said press-chamber guide 26. This result is effected in the following way:—Roller-frame 34 is mounted on a bar 37, said bar 37 being offset a distance near both ends thereof to receive said roller-frame 34 so that the same will not be struck by the fall of the plunger 4. Both ends of said supporting bar 37 project a distance through the guide slots 38 in the two side walls of press-chamber 1. Passing under said ends of said supporting bar 37 are supports 39. Passing through said supports 39 and bolted thereto are the two ends of lifting rods 40, said rods 40 being carried upward through guides 41 attached to the walls of said press-chamber 1, and over said arms 4ª attached to plunger 4 by which said plunger 4 is operated. Washers 42 and 43 respectively are pinned in their required respective positions on said rods 40 and above guides 41, springs 44 being previously placed in position on said rods 40 and between said washers 42 and 43.

Assuming now that the plunger is at the end of its upward stroke and allowed to fall preparatory to compressing a new charge. The supporting framework of a baling-press is comparatively low, so that if the press-chamber guard 26 is bolted immovably to plunger 4 a slot would have to be prepared in the ground into which said guard 26 would drop when the plunger 4 falls to the bottom 9 of press-chamber 1. To obviate the necessity of cutting a slot in the ground, slot 28 is cut in the upper portion of guard 26 so that when said press-chamber guard 26 falls with said plunger 4 and strikes the ground, said plunger 4 continues to descend the full length of its stroke the bolt 29 moving downward in said slot 28 the required distance. When said plunger 4 again advances it draws said guard 26 upward and finally completely out of said slot 32. Just before the point when said guard 26 passes free of slot 32, bar 4ª on plunger 4 engages rods 40 thus drawing roller-frame 34 and roller 35 upward and thus holding said guard 26 in position until again dropped into said slot 32. Springs 44 are inserted to break the fall of roller-frame 34. It will thus be seen that press-chamber guard 26 always closes the opening to said press-chamber 1 when said plunger 4 is not in position to receive a charge. Even though door 7 be open a fresh charge can be prepared and thrown into the chute already to be forced into press-chamber 1 immediately upon the fall of plunger 4. In order to give greater freedom to the movement of said press-chamber guard 26 two vertical slots as 26ᵃ are cut in the upper portion and near the edges thereof adapted to engage bolts as 26ᶜ moving freely in horizontal slots 26ᵇ in supporting plate 30. These crossed slots 26ᵃ and 26ᵇ with bolts 26ᶜ operating freely therein serve to permit a sidewise motion of said guard 26 without breaking or buckling the same. In building a new machine a vertical guide slot, as 45, may be formed in each side of said machine and press-chamber guard 26 adapted to move therein, in which case said roller-frame and roller 34 and 35 respectively would not be required, and a guard of two or more sections as shown in Figs. 12 and 13 may be used. In the latter case a slide 46 on one section engages a lug 47 on the next lower section. It is not my desire to be limited to the exact construction of my improvement described in this specification, as many minor changes in construction and operation may be made without departing from the spirit of my invention.

Having thus described my invention, what I claim as new and desire to secure by Letters Patent is,—

1. The combination in a baling-press of a vertical press box having a press-chamber and a bale-chamber therein, a plunger reciprocable therein, a feed-door, a feed-chute, a discharge-door, and mechanism for operating said press, and a platform rigidly mounted on said press-box in such position as to discharge into said chute, and a curvilinear guard attached to and supported by said feed-door adapted to completely close the aperture between said platform and said press-box when said feed-door is closed.

2. The combination in a baling-press of a vertical press-box having a press-chamber and a bale-chamber therein, a plunger reciprocable therein, a feed-door, a feed-chute, a discharge-door, and mechanism for operating said press, a vertically reciprocating press-chamber guard adapted to completely close the feed opening to said press-chamber when said plunger has completed its upward stroke, and a vertically reciprocating frame operatively positioned in said press-chamber having a roller mounted thereon adapted to engage the inner side of said vertically reciprocating press-chamber guard.

3. The combination in a baling-press of a vertical press-box having a press-chamber and a baling-chamber therein, a plunger reciprocable therein, a feed-door, a feed-chute, a discharge-door, and mechanism for operating said press, and a curvilinear guard attached to the upper edge of said feed-door, said curvilinear guard being reinforced on its inner surface and having a plurality of braces secured thereto and to the outer surface of said feed-door.

4. The combination in a baling-press of a vertical press-box having a press-chamber and a baling-chamber therein, a plunger reciprocable therein, a feed-door, a feed-chute, a discharge-door, and mechanism for operating said press, and a vertically reciprocating press-chamber guard adapted to completely close the feed opening to said press-chamber when said plunger has completed its upward stroke, said press-chamber guard having a vertical slot cut in the center and near the top thereof and a vertical slot cut near each side and near the top thereof, a supporting plate attached to the outer edge of said plunger and means for securing the same in place, said supporting plate having a hole bored through the center thereof and a longitudinal slot cut near each end thereof, and bolts adapted to operate in said slots and hold said supporting plate and said press-chamber guard together.

5. The combination in a baling-press of a vertical press-box having a press-chamber and a bale-chamber therein, a plunger reciprocable therein, a feed-door, a feed-chute, a discharge-door, and mechanism for operating said press, and a vertically reciprocating press-chamber guard adapted to completely close the feed opening to said press-chamber when said plunger has completed its upward stroke, means for slidably and pivotally attaching said press-chamber guard to the outer edge of said plunger, the bottom of said press-chamber having a longitudinal slot formed therein adapted to permit the free vertical movement of said press-chamber guard through said bottom of said press-chamber.

6. The combination in a baling-press of a vertical press-box having a press-chamber and a bale-chamber therein, a plunger reciprocable therein, a feed-door, a feed-chute, a discharge-door, and mechanism for operating said press, and a vertically reciprocating press-chamber guard adapted to completely close the feed opening to said press-chamber when said plunger has completed its upward stroke, a frame adapted to reciprocate in said press-chamber and having a roller mounted thereon adapted to engage the inner surface of said press-chamber guard, a bar offset to receive said roller frame, supporting plates 39, rods 40, guides 41, washers 43, and springs 44.

7. The combination in a baling-press of a vertical press-box having a press-chamber and a bale-chamber therein, a plunger reciprocable therein, a feed-door, a feed-chute, a discharge-door, and mechanism for operating said press, and a vertically reciprocating press-chamber guard adapted to completely close the feed opening to said press-chamber when said plunger has completed its upward stroke, a frame adapted to reciprocate in said press-chamber and having a roller mounted thereon adapted to engage the inner surface of said press-chamber guard, and mechanism by which said frame is raised and lowered the required distance and at the required intervals through the vertical motion of said plunger.

In testimony whereof I affix my signature in presence of two witnesses.

ROBERT O. ATKINSON.

Witnesses:
JOHN A. NAISMITH,
J. B. CAMBERS.